United States Patent Office 3,293,246
Patented Dec. 20, 1966

3,293,246
WATER-SOLUBLE CATIONIC QUINOPHTHALONE DYESTUFFS AND PROCESS FOR PREPARING THEM
Otto Fuchs, Frankfurt am Main, and Friedrich Ische, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 1, 1963, Ser. No. 269,811
Claims priority, application Germany, Apr. 5, 1962, F 36,476
10 Claims. (Cl. 260—247.1)

The present invention relates to water-soluble cationic quinophthalone dyestuffs and to a process for preparing them.

We have found that water-soluble cationic quinophthalone dyestuff corresponding to the general Formula 1

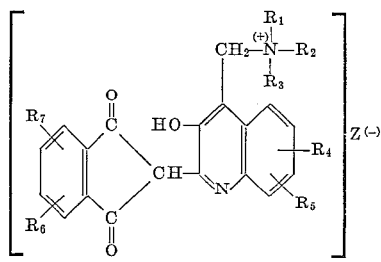

in which $R_1$ and $R_2$ represent hydrogen atoms, alkyl, cycloalkyl or aryl groups and $R_1$ and $R_2$ together with the quaternary nitrogen atom may be constituents of a heterocyclic ring, $R_3$ represents an alkyl group, $R_4$, $R_5$, $R_6$ and $R_7$ represent hydrogen atoms, alkyl groups or halogen atoms and Z stands for an anion, can be prepared by reacting the quinophthalone compound of the general Formula 2

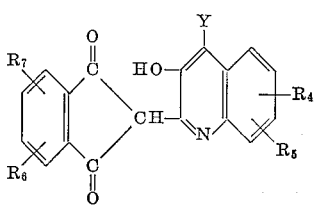

in which Y represents a hydrogen or bromine atom and $R_4$, $R_5$, $R_6$ and $R_7$ have the meanings given above, with formaldehyde and primary or secondary aliphatic, cycloaliphatic, aromatic or heterocyclic amines or with ammonia and treating the thus obtained aminomethyl compounds of the Formula 3

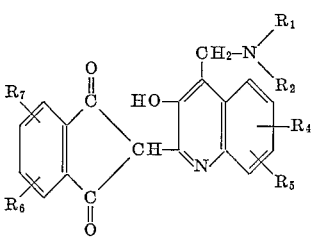

in which $R_1$, $R_2$, $R_4$, $R_5$, $R_6$ and $R_7$ have the meanings given above with alkylating agents.

As amines may be used for example aliphatic amines such as methylamine, ethylamine, propylamine, butylamine, dimethylamine, diethylamine, dipropylamine, dibutylamine or alkylamines containing hydroxyalkyl groups such as diethanolamine, furthermore aromatic amines such as aniline, aminobenzenes or naphthylamines being substituted by halogen atoms alkyl or alkoxy groups, heterocyclic amines such as piperidine or morpholine, or aralkylamines such as benzylamine. Instead of the free amines there may also be used the salts, such, for example, as the hydrochlorides, sulfates or acetates.

The molar ratio of starting dyestuff component to amine is generally 1:1, however, the amine may also be used in excess.

The formaldehyde is suitably used in a molar ratio of 1:1 calculated on the amine, the application of an excess of formaldehyde or amine being possible. The formaldehyde can be used in different form, for example in aqueous solution or in the form of a polymer such as paraformaldehyde.

The reaction takes place at a temperature within the range of about 70° C. and about 150° C., preferably between about 100° C. and 140° C. The individual optimum temperature depends upon the reaction component used.

The reaction can be carried out in an aqueous medium or in an inert organic solvent such, for example, as dimethyl formamide, ethylene glycol, diethylene glycol, diethylene glycol monoethyl ether, dioxane or tetrahydrofuran. When the reaction is carried out at elevated temperatures, it may be necessary, depending on the reactants or the reaction medium used, to work under pressure in an autoclave.

The compound of general Formula 3 is isolated in such a manner that the reaction mixture is poured into water or a low molecular weight alcohol, preferably methanol, and the precipitated product is filtered off. The thus obtained compounds of general Formula 3 are soluble in dilute aqueous acid and can be used from an aqueous acid solution or aqueous dispersion for dyeing synthetic fiber material of, for example, polyacrylonitrile, polyvinylidene cyanide, polyamide, polyethylene terephthalate, cellulose acetate or cellulose triacetate.

The compounds of general Formula 3 thus obtained are quaternized in known manner by reacting them with alkyl halides such as methyl iodide, dialkyl sulfates such as dimethyl sulfate or diethyl sulfate or with para-toluenesulfonic acid alkyl esters such as para-toluenesulfonic acid methyl ester. The cationic final products are generally obtained in a good to very good yield.

The cationic quinophthalone dyestuffs so obtained which correspond to the general Formula 1 are soluble in water and yield from an aqueous bath fast dyeings or prints on synthetic fiber materials such, for example, as polyacrylonitrile, polyvinylidene cyanide, polyamide, polyethylene terephthalate, cellulose acetate or cellulose triacetate. Their very good fastness to light and washing on fiber material of polyacrylonitrile, their good fastness to the thermofixation and good affinity to polyethylene terephthalate fibers are of particular interest.

The following examples serve to illustrate the invention but they are not intended to limit it thereto, the parts and percentages being by weight unless otherwise stated.

Example 1

15 parts of 6-bromo-3-hydroxy-quinophthalone were made into a paste with 50 parts of dimethyl formamide and mixed with 3.5 parts of paraformaldehyde and 3.5 parts of piperidine. After heating for 4 hours at 120° C., the mixture was diluted with 200 parts of water. The precipitating product was filtered off, washed and dried. In order to purify the product it was dissolved in little glacial acetic acid, diluted with 300 parts of water, a small quantity of undissolved matter was separated by filtration and the filtrated clear solution was poured into an excess of diluted sodium carbonate solution. After filtration, washing and drying, 16 parts of pure 6-bromo-3-hydroxy-4-(piperidino-methyl)-quinophthalone were obtained. From an aqueous weakly acetic acid solution this compound dyed fibers and fabrics of polyacrylonitrile, polyvinylidene cyanide, polyamide, cellulose acetate or polyethylene terephthalate yellow tints.

10 parts of this compound were dissolved in 50 parts of dimethyl sulfate and heated for 2 hours at 100° C. After cooling, the solution was diluted in 500 parts of ether. The precipitated product was filtered off, washed with ether and dried. 10 parts of dyestuff of the formula

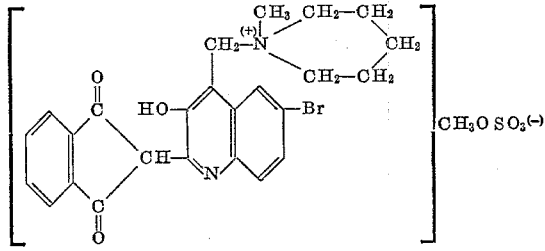

were obtained which dissolved in water and dyed fibers of polyacrylonitrile, polyvinylidene cyanide or polyethylene terephthalate yellow tints.

When using instead of piperidine equimolecular amounts of n-butylamine, benzylamine, aniline or n-methylaniline, aminomethyl quinophthalone dyestuff compounds and quarternary salts thereof were obtained which corresponded to the compounds specified above as regards their chemical and tinctorial properties.

*Example 2*

20 parts of 3'-chloro-3-hydroxy-quinophthalone, 100 parts of ethyl diglycol, 10 parts of paraformaldehyde and 10 parts of piperidine were heated for 5 hours at 140° C. After diluting the reaction mixture with water, filtering off the product, washing and drying, a dyestuff of the formula

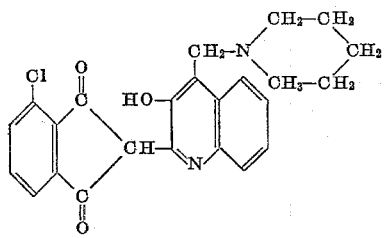

was obtained which from an aqueous dispersion or aqueous acetic acid solution dyed polyethylene terephthalate fibers yellow tints.

When the dyestuff obtained was quaterized with dimethyl sulfate as described in paragraph 2 of Example 1, 20 parts of the cationic water-soluble dyestuff of the formula

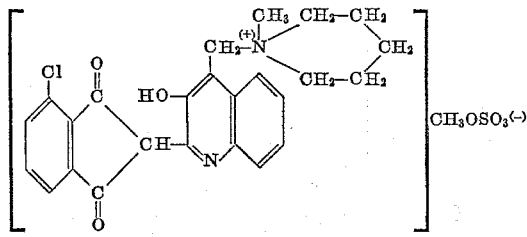

were obtained which dyed fibers of polyacrylonitrile, polyvinylidene cyanide or polyethylene terephthalate yellow tints.

*Example 3*

29 parts of 3-hydroxy-quinophthalone, 6 parts of paraformaldehyde and 16 parts of dimethylamine hydrochloride were heated for 8 hours at a temperature within the range of from 140° C. to 150° C. in 150 parts of dimethyl formamide. The mixture was then diluted with water to 750 cc., the product was filtered off, washed and dried. The 4-(dimethylamino-methyl)-3-hydroxy-quinophthalone was obtained which from an aqueous acetic acid solution dyed fabrics of polyacrylonitrile, polyvinylidene cyanide, polyamide, polyethylene terephthalate or cellulose acetate yellow tints.

By quaternization with dimethyl sulfate according to paragraph 2 of Example 1, there were obtained 25 parts of the cationic water-soluble dyestuff of the formula

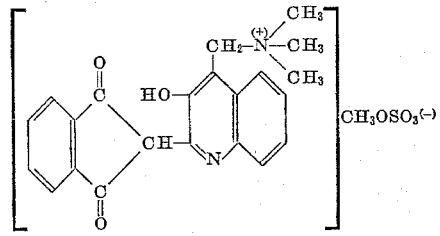

this yield corresponding to 72% of the theoretical. The dyestuff dyed fabrics of the materials specified above likewise yellow tints.

An equal result was obtained when the quaternization was carried out with diethyl sulfate. The cationic dyestuff thus formed contained at the quaternary nitrogen atom an ethyl group instead of a methyl group and as anion $C_2H_5OSO_3^-$.

When using instead of dimethylamine hydrochloride diethylamine hydrochloride, a product was obtained which corresponded to the product specified above as regards its chemical and tinctorial properties.

*Example 4*

29 parts of 3-hydroxy-quinophthalone were heated for 4 hours at 140° C. in an autoclave with 20 parts of a 30% aqueous solution of formaldehyde, 13 parts of piperidine and 100 parts of water. The reaction mixture was cooled, the product was filtered off, washed and dried. A yellow dyestuff of the formula

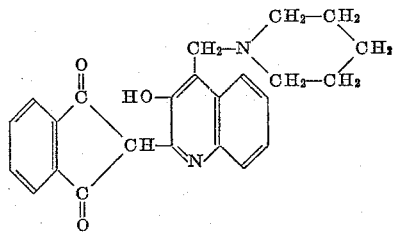

was obtained which from an aqueous dispersion or aqueous acetic acid solution dyed fibers of polyacrylonitrile, polyvinylidene cyanide or polyethylene terephthalate yellow tints.

By quaternization in an excess of para-toluene-sulfonic acid methyl ester at 100° C., 30 parts of the water-soluble cationic dyestuff of the formula

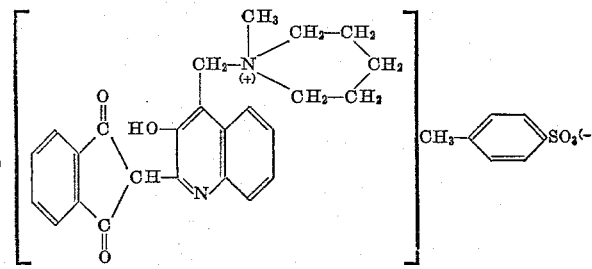

were obtained, this yield corresponding to 77% of the theoretical. This dyestuff dyed the synthetic fibers indicated above likewise yellow tints.

When using morpholine instead of piperidine, a product was obtained which corresponded to the product described above as regards its chemical and tinctorial properties.

*Example 5*

20 parts of 3-hydroxy-6,8-dichloro-quinophthalone were dissolved in 100 parts of glycol and heated for 4 hours at 140° C. with 10 parts of paraformaldehyde and 10 parts of piperidine. After precipitation with 200 parts of methanol, filtering off, washing with methanol and drying, the 3-hydroxy - 4 - (piperidino-methyl)-6-8-dichloro-quinophthalone was obtained which was soluble in dilute acetic acid and dyed fibers of polyacrylonitrile, polyvinylidine cyanide and polyesters yellow tints.

By quaternization with dimethyl sulfate according to paragraph 2, Example 1, 22 parts of the water-soluble cationic dyestuff of the formula

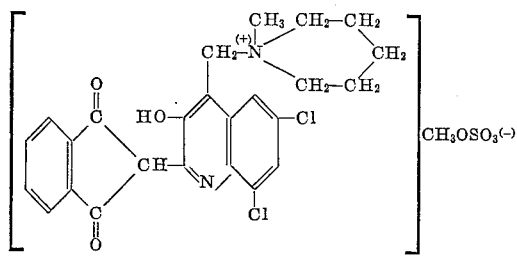

was obtained which from an aqueous solution dyed the fibers named above yellow tints.

When using 3 - hydroxy-5,7-dimethyl-quinophthalone instead of 3-hydroxy-6,8-dichloro-quinophthalone, a dyestuff was obtained which dyed fibers of polyacrylonitrile, polyvinylidene cyanide and polyester yellow tints.

*Example 6*

36.8 parts of 4-bromo-3-hydroxy-quinophthalone were dissolved in 200 parts of dimethyl formamide and heated for 5 hours at a temperature within the range of from 120° to 130° C. with 10 parts of paraformaldehyde and 13 parts of piperidine. The mixture was then diluted with water, filtered off, washed and dried.

There was obtained the 4-(piperidino-methyl)-3-hydroxyquinophthalone described in Example 4 from which by quaternization with dimethyl sulfate according to paragraph 2 of Example 1 the dyestuff of the formula

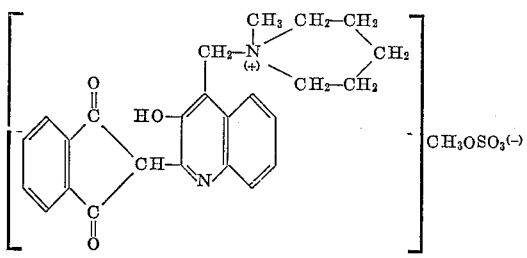

was obtained which form an aqueous solution dyed fibers of polyacrylonitrile, polyvinylidene cyanide and polyesters yellow tints.

An equal result was obtained when the quaternization was carried out with methyl chloride, methyl bromide or methyl iodide, superatmospheric pressure having been applied in the case of methylchloride or methylbromide. In these cases the cationic dyestuff contained as anion $Cl^{(-)}$, $Br^{(-)}$ or $I^{(-)}$.

We claim:
1. The water-soluble cationic quinophthalone dyestuff of the Formula 1

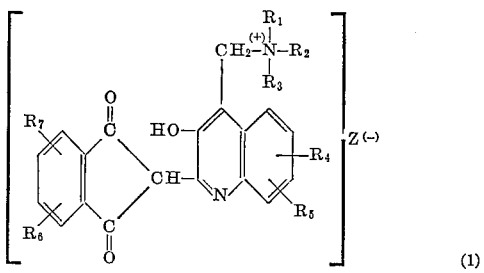

wherein $R_1$ and $R_2$ are selected from the group consisting of hydrogen, lower alkyl, hydroxy lower alkyl benzyl, naphthyl, phenyl, and divalent groups forming together with the quaternary nitrogen atom a saturated heterocyclic ring selected from the group consisting of piperidyl and morphilinyl, $R_3$ represents a lower alkyl, $R_4$, $R_5$, $R_6$ and $R_7$ represent members of the group consisting of hydrogen, chlorine, bromine and lower alkyl, and $Z^{(-)}$ represents an anion of the group consisting of chloride, bromide, iodide, $CH_3OSO_3^{(-)}$, $C_2H_5OSO_3^{(-)}$ and

2. The water-soluble cationic quinophthalone dyestuff of the formula

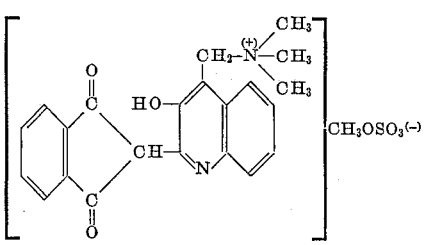

3. The water-soluble cationic quinophthalone dyestuff of the formula

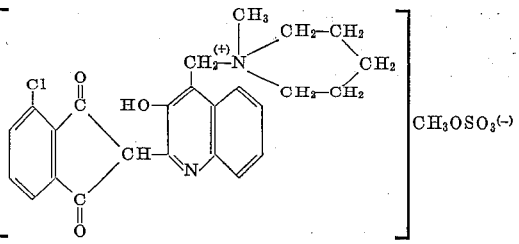

4. The water-soluble cationic quinophthalone dyestuff of the formula

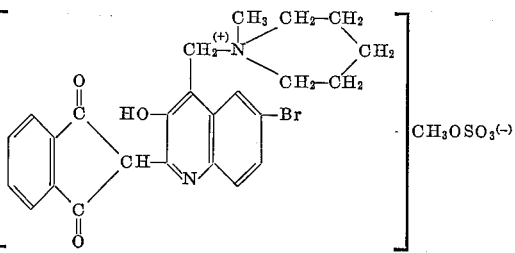

5. The water-soluble cationic quinophthalone dyestuff of the formula

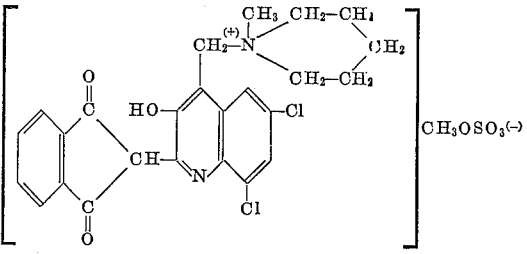

6. The water-soluble cationic quinophthalone dyestuff of the formula

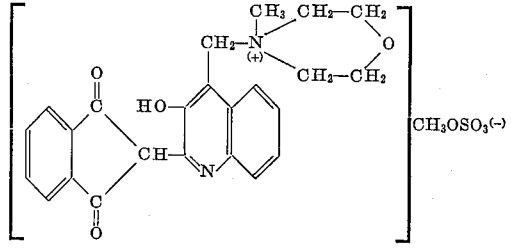

7. The process for preparing the water-soluble cationic quinophthalone dyestuff of the Formula 1

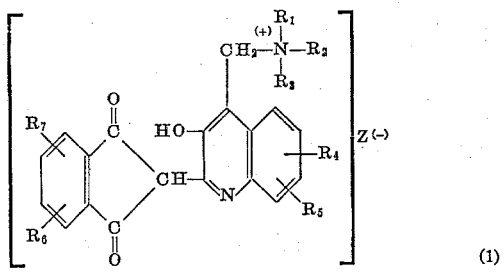

wherein $R_1$ and $R_2$ are selected from the group consisting of hydrogen, lower alkyl, hydroxy lower alkyl, benzyl, naphthyl, phenyl and divalent groups forming together with the quaternary nitrogen atom a saturated heterocyclic ring selected from the group consisting of piperidyl and morpholinyl, $R_3$ represents a lower alkyl, $R_4$ $R_5$, $R_6$ and $R_7$ represent members of the group consisting of hydrogen, chlorine, bromine and lower alkyl, and $Z^{(-)}$ represents an anion of the group consisting of chloride, bromide, iodide, $CH_3OSO_3^{(-)}$, $C_2H_5OSO_3^{(-)}$ and

which comprises reacting at a temperature in the range of front about 70° C. to about 150° C. a quinophthalone having the Formula 2

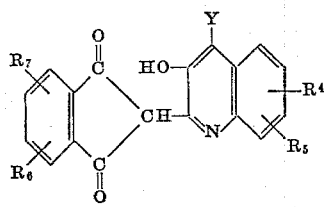

in which Y represents a member of the group consisting of hydrogen and bromide, and $R_4$, $R_5$, $R_6$ and $R_7$ are defined as above, with formaldehyde and an amine of the group consisting of ammonia, a lower monoalkyl amine, a lower dialkyl amine, a di-(hydroxy lower alkyl) amine, benzylamine, aniline, N-lower alkylaniline, piperidine and morpholine, and alkylating the primarily obtained quinophthalone aminomethyl compounds having the Formula 3

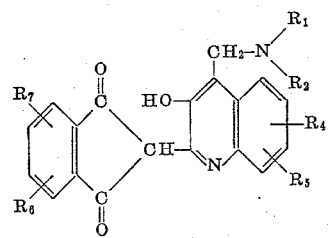

in which $R_1$, $R_2$, $R_4$, $R_5$, $R_6$ and $R_7$ are defined as above, with an alkylating agent.

8. A process as claimed in claim 7, wherein the reaction of a compound of the Formula 2 yielding a compound having the Formula 3 is carried out in an aqueous medium.

9. A process as claimed in claim 8, where the reaction of a compound of the Formula 2 yielding a compound having the Formula 3 is carried out in an inert polar oxygenated organic solvent.

10. The process of claim 7 wherein $R_1$ and $R_2$ represent substituents of an amino nitrogen of the amines selected from the group consisting of piperidine and morpholine.

References Cited by the Examiner
UNITED STATES PATENTS
2,795,582   6/1957   Bauer et al. _____ 260—247.5

ALEX MAZEL, *Primary Examiner.*
NICHOLAS S. RIZZO, *Examiner.*
D. M. KERR, D. G. DAUS, *Assistant Examiners.*